(12) United States Patent
Bill et al.

(10) Patent No.: US 11,753,180 B2
(45) Date of Patent: *Sep. 12, 2023

(54) SENSOR NETWORK

(71) Applicants: Airbus Operations Limited, Bristol (GB); Airbus Operations GmbH, Hamburg (DE)

(72) Inventors: Andrew Bill, Bristol (GB); Kurt Bruggemann, Bristol (GB); Timo Warns, Hamburg (DE)

(73) Assignees: Airbus Operations Limited, Bristol (GB); Airbus Operations GmbH, Hamburg (DE)

( * ) Notice: Subject to any disclaimer, the term of this patent is extended or adjusted under 35 U.S.C. 154(b) by 146 days.

This patent is subject to a terminal disclaimer.

(21) Appl. No.: 17/111,139

(22) Filed: Dec. 3, 2020

(65) Prior Publication Data

US 2021/0114745 A1   Apr. 22, 2021

Related U.S. Application Data

(63) Continuation of application No. 15/607,284, filed on May 26, 2017, now Pat. No. 10,858,121.

(30) Foreign Application Priority Data

May 27, 2016 (GB) ...................................... 1609420
Sep. 20, 2016 (GB) ...................................... 1615976
Apr. 27, 2017 (GB) ...................................... 1706752

(51) Int. Cl.
*H04L 9/40* (2022.01)
*H04W 88/04* (2009.01)
(Continued)

(52) U.S. Cl.
CPC ............ *B64D 45/00* (2013.01); *B64C 25/001* (2013.01); *G07C 5/008* (2013.01); *H04L 9/0819* (2013.01);
(Continued)

(58) Field of Classification Search
CPC ........ B64D 2045/0085; B64D 2045/00; G06F 21/44; H04L 63/045; H04L 63/0492;
(Continued)

(56) References Cited

U.S. PATENT DOCUMENTS 7,231,180 B2   6/2007   Benson et al.
8,107,397 B1   1/2012   Bagchi
(Continued)

FOREIGN PATENT DOCUMENTS

CN   103442359   12/2013
EP   1 803 249   7/2007
(Continued)

OTHER PUBLICATIONS

W. Abdallah, N. Boudriga, D. Kim and S. An, "An efficient and scalable key management mechanism for Wireless Sensor Networks," 2015 17th International Conference on Advanced Communication Technology (ICACT), 2015, pp. 480-493, doi: 10.1109/ICACT.2015.7224913. (Year: 2015).*

(Continued)

*Primary Examiner* — Michael Simitoski
(74) *Attorney, Agent, or Firm* — Nixon & Vanderhye P.C.

(57) ABSTRACT

A sensor network for use in an aircraft, including a plurality of wireless nodes. A first wireless node of the plurality of wireless nodes is arranged to communicate with at least one other wireless node of the plurality of wireless nodes. The communication is via a secure communications channel and is on the basis of a control message received at the first wireless node. The at least one other wireless node is
(Continued)

arranged to perform an operation on the basis of the control message.

16 Claims, 7 Drawing Sheets

(51) Int. Cl.

| | |
|---|---|
| *H04W 12/041* | (2021.01) |
| *H04L 9/32* | (2006.01) |
| *H04L 9/08* | (2006.01) |
| *H04W 12/04* | (2021.01) |
| *G06F 21/44* | (2013.01) |
| *B64D 45/00* | (2006.01) |
| *H04W 12/08* | (2021.01) |
| *B64C 25/00* | (2006.01) |
| *G07C 5/00* | (2006.01) |
| *H04W 48/08* | (2009.01) |
| *B64C 25/34* | (2006.01) |
| *B64C 25/42* | (2006.01) |
| *B64C 25/50* | (2006.01) |
| *H04W 88/08* | (2009.01) |

(52) U.S. Cl.
CPC .......... *H04L 9/321* (2013.01); *H04L 9/3271* (2013.01); *H04L 63/045* (2013.01); *H04L 63/0492* (2013.01); *H04L 63/062* (2013.01); *H04W 12/041* (2021.01); *H04W 12/08* (2013.01); *H04W 88/04* (2013.01); *B64C 25/34* (2013.01); *B64C 25/42* (2013.01); *B64C 25/50* (2013.01); *B64D 2045/0085* (2013.01); *G06F 21/44* (2013.01); *H04L 9/0838* (2013.01); *H04L 63/08* (2013.01); *H04L 63/166* (2013.01); *H04L 2209/80* (2013.01); *H04W 12/04* (2013.01); *H04W 48/08* (2013.01); *H04W 88/08* (2013.01)

(58) Field of Classification Search
CPC ..... H04L 63/062; H04L 63/08; H04L 63/166; H04L 9/0819; H04L 9/0838; H04L 9/321; H04W 12/04; H04W 12/08; H04W 48/08; H04W 88/04; H04W 88/08
See application file for complete search history.

(56) References Cited

U.S. PATENT DOCUMENTS

| | | | |
|---|---|---|---|
| 8,332,133 | B2 | 12/2012 | Ferro et al. |
| 8,346,949 | B2 | 1/2013 | Vaarala et al. |
| 8,787,904 | B1 | 7/2014 | Hayes et al. |
| 9,008,868 | B1 | 4/2015 | Bantoft et al. |
| 9,043,938 | B1 | 5/2015 | Raghu et al. |
| 9,509,679 | B2 | 11/2016 | Abbott |
| 9,947,009 | B1 | 4/2018 | Sandberg-Diment |
| 9,948,455 | B2* | 4/2018 | Bernsen ................ H04L 9/0838 |
| 10,700,860 | B2* | 6/2020 | Walrant ................ H04L 9/0891 |
| 2004/0073571 | A1 | 4/2004 | Kumhyr et al. |
| 2004/0127277 | A1 | 7/2004 | Walker et al. |
| 2005/0228996 | A1 | 10/2005 | Mayer |
| 2005/0262575 | A1 | 11/2005 | Dweck et al. |
| 2006/0252422 | A1 | 11/2006 | Kauffman et al. |
| 2007/0015463 | A1* | 1/2007 | Abel ................... H04L 63/0823 455/41.1 |
| 2009/0063852 | A1 | 3/2009 | Messerges et al. |
| 2009/0167535 | A1 | 7/2009 | Sanchez |
| 2009/0243895 | A1 | 10/2009 | Mitchell et al. |
| 2010/0096452 | A1 | 4/2010 | Habraken |
| 2010/0164693 | A1 | 7/2010 | Zhang et al. |
| 2010/0290622 | A1 | 11/2010 | Garcia Morchon et al. |
| 2011/0211699 | A1 | 9/2011 | Ma |
| 2011/0299470 | A1 | 12/2011 | Muller et al. |
| 2011/0302635 | A1 | 12/2011 | Pratt, Jr. et al. |
| 2012/0026016 | A1* | 2/2012 | Mitchell ................ G06Q 50/30 340/572.1 |
| 2012/0152297 | A1* | 6/2012 | Mitchell ................ H01L 35/30 136/205 |
| 2012/0237033 | A1* | 9/2012 | Tanaka .................. H04W 12/06 380/270 |
| 2012/0324218 | A1 | 12/2012 | Duren et al. |
| 2013/0005445 | A1 | 1/2013 | Walker et al. |
| 2013/0136265 | A1* | 5/2013 | Pinder ................... H04W 12/04 380/279 |
| 2013/0268759 | A1 | 10/2013 | Blankenbeckler |
| 2014/0028818 | A1 | 1/2014 | Brockway, III et al. |
| 2014/0204727 | A1* | 7/2014 | Gu ........................ H04L 9/0891 370/217 |
| 2014/0226821 | A1* | 8/2014 | Kurdziel ............... H04L 9/0827 380/278 |
| 2014/0376721 | A1 | 12/2014 | Perez et al. |
| 2015/0030158 | A1 | 1/2015 | Noda |
| 2015/0071139 | A1 | 3/2015 | Nix |
| 2015/0203216 | A1 | 7/2015 | Goldstein et al. |
| 2015/0363981 | A1 | 12/2015 | Ziarno |
| 2016/0099922 | A1 | 4/2016 | Dover |
| 2016/0285844 | A1 | 9/2016 | Olivereau |
| 2016/0294829 | A1 | 10/2016 | Angus |
| 2016/0334786 | A1 | 11/2016 | Warpinski et al. |
| 2017/0126402 | A1* | 5/2017 | Medvinsky ........... H04L 9/0866 |
| 2017/0201937 | A1 | 7/2017 | Zhang et al. |
| 2017/0308895 | A1 | 10/2017 | Srivastava et al. |
| 2019/0007408 | A1 | 1/2019 | Angus |

FOREIGN PATENT DOCUMENTS

| | | |
|---|---|---|
| EP | 1876759 | 1/2008 |
| EP | 1993301 | 11/2008 |
| EP | 2 031 538 | 3/2009 |
| EP | 2706423 | 3/2014 |
| EP | 2 910 393 | 8/2015 |
| WO | 2007/041824 | 4/2007 |
| WO | 2008/122906 | 10/2008 |
| WO | 2013/121076 | 8/2013 |

OTHER PUBLICATIONS

R. N. Akram et al., "Challenges of security and trust in Avionics Wireless Networks," 2015 IEEE/AIAA 34th Digital Avionics Systems Conference (DASC), 2015, pp. 4B1-1-4B1-12, doi: 10.1109/DASC.2015.7311416. (Year: 2015).*
R. Di Pietro, L. V. Mancini, Yee Wei Law, S. Etalle and P. Havinga, "LKHW: a directed diffusion-based secure multicast scheme for wireless sensor networks," 2003 International Conference on Parallel Processing Workshops, 2003. Proceedings., 2003, pp. 397-406, doi: 10.1109/ICPPW.2003.1240395. (Year: 2003).*
K. Ren, W. Lou, B. Zhu and S. Jajodia, "Secure and Efficient Multicast in Wireless Sensor Networks Allowing Ad hoc Group Formation," in IEEE Transactions on Vehicular Technology, vol. 58, No. 4, pp. 2018-2029, May 2009, doi: 10.1109/TVT.2008.2003961. (Year: 2009).*
Walrant et al. EP16203906—Written Description (Dec. 13, 2016). (Year: 2016).*
Jamal N. Al-Karaki et al., "On the Development of Adaptive and Self-Dependent Secure Routing Protocol (ASSP) for Wireless Sensor Networks", Jordan University of Science and Technology, Nov. 2010, 9 pages.
K. Sampigethaya, Mingyan Li, R. Poovendran, R. Robinson, L. Bushnell and S. Lintelman, "Secure wireless collection and distribution of commercial airplane health data," 2007 IEEE/AIAA 26th Digital Avionics Systems Confernece, Dallas, TX, 2007, pp. 4.E. 6-1-4.E.6-8. (Year: 2007).
Jamal N Al-Karaki et al: "On the development of adaptive and self dependent secure routing for wireless sensor networks", Advances in Mobile Computing and Multimedia, ACM, Nov. 8, 2010 (Nov. 8, 2010), pp. 288-294, XP058312768, (Year: 2010).
Thanh Dai Tran, "Controlled Link Establishment Attacks on Distributed Sensor Networks and Countermeasures", Dec. 2010, University of Technology, Sydney (Year: 2010).

(56) References Cited

OTHER PUBLICATIONS

T. Kavitha, D. Sridharan, "Security Vulnerabilities in Wireless Sensor Networks: A Survey", Jun. 23, 2009, Dynamic Publishers, Inc. (Year: 2009).

Alimi, Vincent, and Marc Pasquet. "Post-distribution provisioning and personalization of a payment application on a UICC-based Secure Element." 2009 International Conference on Availability Reliability and Security IEEE, 2009 (Year 2009).

\* cited by examiner

SENSOR NETWORK

RELATED APPLICATION

This application is a continuation of U.S. application Ser. No. 15/607,284, filed May 26, 2017, and claims priority to each of United Kingdom patent applications GB1706752.1 filed 27 Apr. 2017; GB1615976.6 filed 20 Sep. 2016 and GB1609420.3 filed 27 May 2016 each of which is incorporated by reference in their entireties.

TECHNICAL FIELD

The present invention relates to a sensor network for use in an aircraft, to a method of operating a sensor network in an aircraft, and to aircraft wireless nodes configured for use in a sensor network in an aircraft.

BACKGROUND

Modern vehicles, for example, aircraft, use sensors to detect parameters relating to the vehicles' operation. In particular, sensors may be placed around the vehicle to gather data which describes the state of the vehicle. This data can be used to help maintain the vehicle, including ensuring the safety of the vehicle and prolonging its lifetime. Sensors may be arranged in a wired or wireless system. A wireless system has advantages over a wired system in that cabling requirements can be reduced and weight reduced. This may lead in addition to a simpler design. However, it can be harder to guarantee the integrity and confidentiality of the data in a wireless system, when compared to a wired system.

SUMMARY

A first aspect of the present invention provides a sensor network for use in an aircraft, the sensor network comprising: a plurality of wireless nodes wherein a first wireless node of the plurality of wireless nodes is arranged to communicate with at least one other wireless node of the plurality of wireless nodes via a secure communications channel, on the basis of a control message received at the first wireless node; and wherein the at least one other wireless node of the plurality of wireless nodes in the sensor network is arranged to perform an operation on the basis of the control message.

Optionally, the first wireless node is arranged to receive the control message and one or more cryptographic keys from a remote computing device.

Optionally, the secure communications channel is secured by at least one of the one or more cryptographic keys.

Optionally, the first wireless node is arranged to communicate, via the secure communications channel, one or more replacement cryptographic keys for replacing at least one of the one or more cryptographic keys.

Optionally, the first wireless node comprises a communications interface for interfacing with a communications channel, other than the secure communications channel, to receive the one or more replacement cryptographic keys.

Optionally, the operation comprises a configuration operation to use at least one of the one or more replacement cryptographic keys in place of the at least one of the one or more cryptographic keys.

Optionally, the configuration operation comprises: causing the at least one other of the plurality of wireless nodes to send the at least one replacement cryptographic key to one or more of the plurality of wireless nodes.

Optionally, the sensor network is arranged to secure the secure communications channel using the at least one replacement cryptographic key.

Optionally, the control message comprises a request for data stored on the sensor network.

Optionally, the operation comprises communicating the data to the first wireless node, via the secure communications channel.

Optionally, the first wireless node is arranged to authenticate data received from the at least one other wireless node.

Optionally, the first wireless node is arranged to communicate with a remote computing device over a short-range communications channel.

Optionally, the first wireless node is a wireless sensor node.

Optionally, the first wireless node or the at least one other wireless node is a wireless access point.

A second aspect of the present invention provides an aircraft wireless node configured for use in a sensor network in an aircraft, the sensor network comprising a plurality of wireless nodes, the aircraft wireless node being arranged to: receive a control message; and communicate with at least one other wireless node of the plurality of wireless nodes of the sensor network, via a secure communications channel, on the basis of the control message.

Optionally, the aircraft wireless node comprises a communications interface for interfacing with a communications channel other than the secure communications channel Optionally, the aircraft wireless node is arranged to communicate with a remote computing device over a short-range communications channel.

A third aspect of the present invention provides an aircraft wireless node configured for use in a sensor network in an aircraft, the sensor network comprising a plurality of wireless nodes, the aircraft wireless node being arranged to: communicate, via a secure communications channel, with at least one other wireless node of the plurality of wireless nodes of the sensor network; and perform an operation on the basis of the communication via the secure communications channel, the operation being on the basis of a control message received at the at least one other wireless node.

Optionally, the operation of the aircraft wireless node comprises sending one or more received cryptographic keys to the at least one other wireless node.

A fourth aspect of the present invention provides an aircraft wireless node configured for use in a sensor network of an aircraft, the aircraft wireless node being configured to send one or more cryptographic keys to a remote computing device over a communications channels on receipt of a request for the one or more cryptographic keys.

Optionally, the communications channel is a short-range communications channel.

Optionally the aircraft wireless node comprises a first storage for storing a first cryptographic key and a second storage for storing a second cryptographic key wherein the first storage and second storage are isolated from each other.

Optionally the aircraft wireless node is a sensor node or a wireless access point.

A fifth aspect of the present invention provides an aircraft comprising a sensor network or one or more aircraft wireless nodes according to the previous embodiments.

A sixth aspect of the present invention provides a method of operating a sensor network in an aircraft, the sensor network comprising a plurality of wireless nodes, the method comprising: communicating a control message to a first wireless node of the sensor network; the first wireless node communicating via a secure communications channel with at least one other wireless node of the plurality of wireless nodes of the sensor network; the at least one other wireless node performing an operation on the basis of the control message.

Optionally, the method comprises communicating one or more cryptographic keys to the first wireless node.

Optionally, the method comprises a computing device performing the communicating of the control message and the communicating of the one or more cryptographic keys.

Optionally, the method comprises retrieving the one or more cryptographic keys from a second wireless node in the sensor network, prior to communicating the one or more cryptographic keys to the first wireless node.

Optionally, the method comprises establishing the secure communications channel with at least one of the one or more cryptographic keys.

Optionally, the method comprises communicating one or more replacement cryptographic keys for replacing at least one of the one or more cryptographic keys.

Optionally, the method wherein the communicating the one or more replacement cryptographic keys comprises communicating the one or more replacement cryptographic keys to the first wireless node.

Optionally, the method comprises communicating the one or more replacement cryptographic keys via a communications channel other than the secure communications channel.

Optionally, the method wherein the communications channel other than the secure communications channel is a further secure communications channel.

Optionally, the control message comprises an instruction to replace at least one of the one or more cryptographic keys with at least one of the one or more replacement cryptographic keys Optionally, the method comprises communicating the one or more replacement cryptographic keys to the at least one other wireless node via the secure communications channel.

Optionally, the operation comprises a configuration operation to use the at least one of the one or more replacement cryptographic keys in place of at least one of the one or more cryptographic keys.

Optionally, the configuration operation comprises: sending the at least one of the one or more replacement cryptographic key to one or more of the plurality of wireless nodes.

Optionally, the operation comprises securing the secure communications channel using the at least one of the one or more replacement cryptographic keys.

Optionally, the control message comprises a request for data stored on the sensor network.

Optionally, the method comprises communicating a request to the at least one other node for data via the secure communications channel.

Optionally, the operation comprises communicating the data, via the secure communications channel, to the first wireless node.

Optionally, the method comprises authenticating the data using a cryptographic key Optionally, the operation comprises requesting the data from one or more of the plurality of wireless nodes.

Optionally, the control message is communicated to the first wireless node via a communications channel other than the secure communications channel.

Optionally, the communications channel other than the secure communications channel is a short-range communications channel.

Optionally, the method comprises authenticating the one or more cryptographic keys or the at least one replacement cryptographic key.

Optionally, the method wherein generating one or more cryptographic keys comprises performing a key exchange between two or more nodes of the sensor network.

BRIEF DESCRIPTION OF THE DRAWINGS

Embodiments of the invention will now be described, by way of example only, with reference to the accompanying drawings, in which.

DETAILED DESCRIPTION

Figure 1:
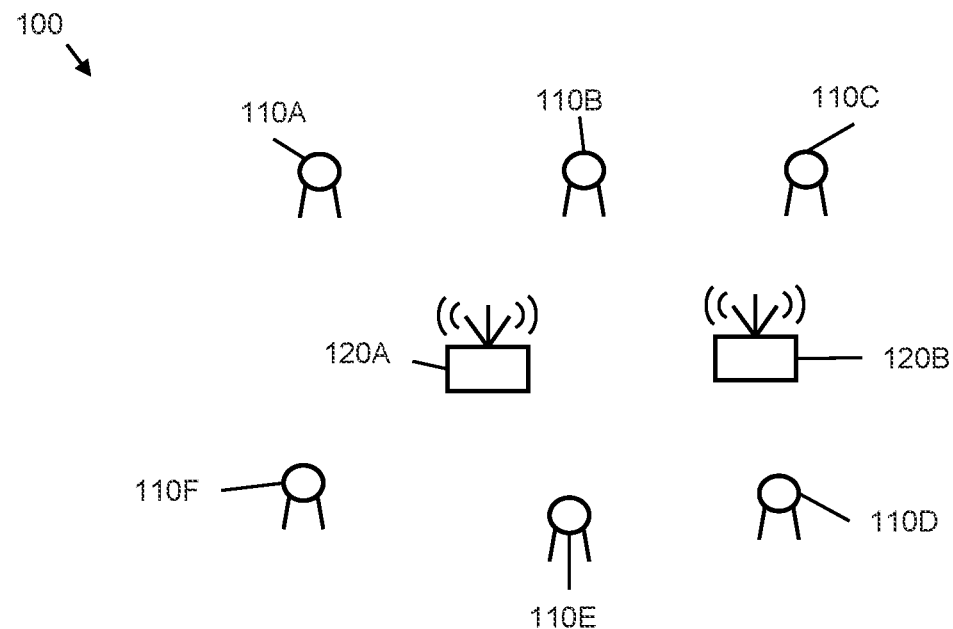
FIG. 1 is a schematic diagram of a sensor network according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain methods and systems described herein relate to the operation of a sensor network in an aircraft. In examples described herein, references to "aircraft" include all kinds of aircraft, such as fixed wing, for example military or commercial aircraft, or unmanned aerial vehicles (UAVs), and rotary wing aircraft, for example helicopters.

Current aircraft on-board sensors may communicate data to avionics systems of the aircraft, via a wired communications link between each sensor and the avionics system. This configuration precludes a remote computing device outside the aircraft from being able to communicate with the on-board sensors or access sensor data collected by the on-board sensors without plugging-in the remote computing device to each individual sensor. This is a time-consuming process, particularly on an aircraft comprising a large number of sensors, and may directly impact time needed to be spent on maintenance of the aircraft. Moreover, the cabling required to operate a wired system can be prone to faults and increases the weight of the aircraft.

According to examples herein, a wireless sensor network system presents advantages over existing wired system. For instance, it is possible to communicate directly with the sensors from outside of the system, which allows ground crew to carry out maintenance of the aircraft more efficiently, for example, without having to go on board the aircraft. Furthermore, the wiring requirements for a network of wireless sensors is considerably lower than in a comparable wired system, which reduces the weight of the aircraft and makes manufacturing and designing the aircraft more straightforward.

Wireless sensor network systems, however, are open to a number of security threats. An attacker could use an attacker-controlled wireless device to spoof components of the sensor network and introduce false sensor data, eavesdrop on communications between the sensors and wireless access points in communication with the sensors, replay recorded messages or flood components of the sensor network with junk data. Furthermore, an attacker could use a wireless device to send specially crafted wireless messages to components of the sensor network. Such messages could trigger one or more vulnerabilities within the components, with the result that the attacker gains control over certain functions of the sensor network. Potentially, an attacker could use the sensor network as a stepping-stone to other critical components of the aircraft.

Examples described herein address these challenges by providing a secure sensor network that helps to ensure the confidentiality and integrity of data on the sensor network. In certain examples described herein, the data in the sensor network is protected by strong cryptographic algorithms that help to guarantee confidentiality and integrity of data. An aspect of ensuring cryptographic security lies in the ability to manage cryptographic keys. For example, it is advantageous to be able to "re-key" cryptographic keys on the sensor network, such that old keys can be invalidated when a sensor, that stores previously-used keys, is removed from the sensor network. In particular, it is desirable to take steps to ensure that the old keys can no longer be used to decrypt data on the sensor network. However, it is also desirable not to reduce the availability of data on the sensor network due to the increased security requirements in a wireless sensor network in comparison to a wired sensor network. Methods and apparatus described herein aim to help achieve data availability in a wireless environment without compromising security.

FIG. 1 is a simplified schematic diagram of a sensor network 100 in an aircraft, according to an example. The sensor network 100 comprises a plurality of wireless nodes 110A-110F and 120A, 120B. The sensor network 100 shown in FIG. 1 comprises two kinds of wireless nodes. Certain wireless nodes 110A-110F are sensor nodes that are arranged to collect sensor data relating to the aircraft or its environment and may be distributed at a variety of locations around the aircraft, depending on the kind of data that is being detected by the sensor node. For example, pressure sensor nodes may be located in the wheels of the aircraft, and temperature sensor nodes may be located at various temperature critical points of the aircraft. Each of the wireless sensor nodes 110 comprises a wireless interface to wirelessly transmit and receive data, one or more sensors, a processor for controlling the operation of the wireless sensor node and memory for storing data.

Certain other wireless nodes 120A, 120B are wireless access points (WAPs). Each of the WAPs 120 comprises a wireless interface, comprising a transmitter and a receiver for wirelessly communicating data, and at least one processor and memory for storing data. The WAPs 120 are configured to wirelessly receive sensor data generated by the plurality of sensor nodes 110 which are located on the aircraft. The WAPs 120 may be arranged to transmit the data to an avionics systems of the aircraft. For example, if one or more of the sensor nodes 110 is located at the wheels of the aircraft, one of the WAPs 120 may be located in the landing gear bay and may be arranged to communicate data received from the sensor node(s) 110 at the wheels to the cockpit of the aircraft.

In the example shown in FIG. 1, the sensor network 100 comprises a plurality of sensor nodes 110 and a plurality of WAPs 120. However, in other examples, the sensor network 100 may comprise fewer than two WAPs. In some examples, the sensor network 100 may comprise a plurality of sensor nodes distributed around the aircraft and arranged to communicate data with each other. Such a sensor network 100 may comprise no WAPs.

The sensor network 100 of this example is a secure network. Each sensor node 110 and WAP 120 is arranged to communicate via a secure communications channel with at least one other node of the plurality of sensor nodes 110 and WAPs 120. In one example, the sensor network 100 is secured by one or more cryptographic keys, whereby each of the secure communications channels is secured using at least one of the one or more cryptographic keys. References to "securing" data herein comprise performing one or more cryptographic operations on the data using a cryptographic key and algorithm including, but not limited to, one or more of: encrypting, authenticating, signing or hashing data.

According to an example, the sensor network 100 uses one cryptographic master key to secure communications across the sensor network for the whole aircraft. The cryptographic master key prevents an attacker from intercepting and reading data that is transmitted on the sensor network 100. Moreover, each sensor node 110 may store one or more other cryptographic key, which is or are used to protect the integrity of the sensor data that is received at the sensor nodes 110. In some examples, one or more additional cryptographic keys may be used for further cryptographic operations. For example, in one case, sensor nodes 110 securely communicate with WAPs 120 using session keys derived from the master key.

In certain examples, the sensor nodes 110 and WAPs 120 are arranged to carry out further input/output validation. For example, the sensor nodes 110 and WAPs 120 may be arranged to validate data by checking that data fields of incoming and outgoing data packets are of the expected length and/or that parameters, such as tyre pressure, are within expected or reasonable ranges for an aircraft.

According to an example, each of the sensor nodes 110 and WAPs 120 comprise at least a first and a second memory for storing at least a first and a second cryptographic key, respectively, in such a way that the keys are isolated from one another. In this example, obtaining a cryptographic key from the first memory does not provide access to a cryptographic key stored in the second memory, and so data that is secured by the second key is not compromised. In certain cases, the sensor nodes 110 and WAPs 120 may also comprise first and second processors that are isolated from one another. In a further example, the sensor nodes 110 and WAPs 120 may comprise "cold memory" which can be read from and written to in a powered-down state as well as when the node is powered up. For example, the cryptographic keys stored in the cold memory can be replaced when the node is in a powered down state. Thus keys can be replaced even in the event of a power failure.

Secure use of multiple cryptographic keys in a system requires a method of key management to mitigate risk. In particular, frequent re-keying and deletion of obsolete keys can help protect the system, if a component of the system becomes compromised by an attacker. Certain methods and systems described herein may be used to securely update or re-key one or more cryptographic keys. Cryptographic keys are, for example, re-keyed in response to changes in the sensor network 100. For example, a sensor node 110 may become defunct and require replacement. In such circumstances, it is desirable to be able to re-key any shared keys on the sensor network 100 to secure the sensor network 100 against an adversary that obtains the old sensor node and retrieves the previously used cryptographic keys from it. In particular, re-keying cryptographic keys invalidates previously used cryptographic keys on the sensor network 100. In another example, when a new sensor node 110 is installed on the aircraft it may be necessary to provide new keys and replace the existing keys with the new keys.

Some or all of the sensor nodes 110 and WAPs 120 are arranged to perform operations in response to control messages. The control messages may be received from remote computing devices that are external to the sensor network 100, or from other nodes of the sensor network 100. A wireless node 110, 120 may receive a control message, e.g. from a remote computing device, and perform one or more actions by communicating (via the secure communications channel) with at least one other wireless node of the plurality of sensor nodes 110 and WAPs 120. The at least one other wireless node is arranged to perform an operation on the basis of the control message. This operation may comprise communicating with further nodes in the sensor network 100. In another example, the at least one wireless node may perform an operation in relation to one or more cryptographic keys stored on the wireless node, or data stored on the wireless node on the basis of the control message. An operation comprising replacing a cryptographic key with a replacement cryptographic key may be performed. This operation is performed securely and may help to ensure that no attacker can compromise the sensor network 100. Further examples are described herein which allow an operator to communicate with a wireless node of the sensor network to initiate network operations. In particular, an operator can control a computing device to send a control message to a first wireless node to cause operations by many or all of the sensor nodes 110 and WAPs 120 of the sensor network 100.

Figure 2:
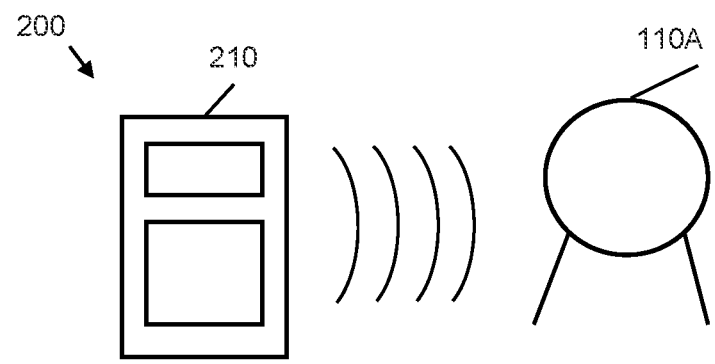
FIG. 2 is a schematic diagram of a computing device and sensor node according to an example.

FIG. 2 is a simplified schematic diagram of a sensor node 110 in communication with a computing device 210. In the example shown in FIG. 2, the computing device 210 is not a part of the sensor network 100. The sensor node 110 is one of the sensor nodes 110A-110F shown in FIG. 1. The computing device 210 may also be used to communicate with the WAPs 120 shown in FIG. 1. The computing device 210 may be used in conjunction with examples described herein to communicate with the sensor network 100 in the aircraft. In particular, in the description which follows, the computing device 210 may be used in conjunction with the sensor network 100 to communicate with wireless nodes of the sensor network 100. For example, the computing device 210 may be used to send and receive data, cryptographic keys and control messages to control the sensor network 100.

In examples described herein, the computing device 210 may be a handheld computing device, such as a tablet computer, a smart phone, or a PDA. According to a first example, the computing device 210 comprises a wireless interface for communicating with the sensor node 110. According to a second example, a dongle may be coupled to the computing device 210 to provide the computing device with a wireless interface. In both cases, the computing device 210 can wirelessly transmit and receive data over a communications channel from the sensor node 110 via the wireless interface. According to an example, the communications channel is a different communications channel from the secure communications channels used in the sensor network 100 between the sensor nodes 110 and WAPs 120. In particular, the communications channel between the computing device and the sensor network may operate on a radio frequency distinct from secure communications channels that are used for communications between the sensor nodes 110 and WAPs 120 in the sensor network 100. The communications channel between the computing device 210 and sensor node 110A may be a short-range communications channel, such as a Bluetooth channel or Near-Field Communication (NFC) channel. According to examples described herein a "short-range" communications channel may be a channel that allows communication between a transmitter and receiver within physical proximity that is not accessible to attackers. How short the range is may be determined by the context of the operation of the sensor network. In particular, the range may have an upper limit determined to be within the range in which authorised personnel typically need to be to perform their duties. For instance, in cases involving large commercial aircraft that are typically serviced in hangars, which are secured from unauthorised personnel, the range may be less than 20 metres, less than 10 metres, less than five metres or even less than two metres or one metre. The range may be determined by the size of the aircraft and/or the size of the secured hangars or other secured areas within which the aircraft are expected to be maintained. In other cases, for instance relating to smaller aircraft, the range may be commensurately less than it is for large commercial aircraft, such as less than one metre, less than 50 cm or less than 10 cm. In some cases, range may be minimal, or even approaching touching distance, for example if there are insufficient barriers to prevent unauthorised personnel from approaching the vehicle. Alternatively, or in addition, range may be determined by physical constraints on accessing respective devices. For example, the range may need a lower limit in addition to an upper limit. The lower limit may be one metre, or two or five meters, if sensor nodes are out of the normal reach of an authorised person. In general, communications range upper and/or lower limits may be adjusted as needed according to operating context by adjusting communications power, communications protocol and/or RF shielding associated with the various devices and communications channels.

The computing device 210 may be operated by authorised ground crew personnel during, for example, maintenance of the aircraft. Authorised ground crew personnel can use the computing device 210 to interact with the sensor network 100 when the aircraft is stationed on the ground by bringing the computing device 210 in proximity of the sensor node 110A. According to examples described herein a short-range communications channel between the computing device 210 and the sensor node 110A is used to ensure only those persons authorised to be within the immediate vicinity of the aircraft can communicate with the sensor network 100 using the computing device 210. In particular, when a short-range communications channel is used, a person who tried to access the sensor network 100 remotely using an unauthorised device would not be able to communicate with the sensor network 100 over the short-range communications channel. In certain examples, the computing device 210 is also configured to communicate with the sensor network 100 via the secure communications channels used between the sensor nodes 110 and WAPs 120 in the sensor network 100. In particular, if the computing device 210 has access to the appropriate cryptographic keys to communicate with the sensor nodes 110 and WAPs 120, the computing device 210 may also be able to send and receive messages over those secure communications channels. The computing device 210 and sensor node 110A may implement one or more protocol stacks to communicate over different communications channels. According to an example, segregation between a wireless protocol stack that is used to communicate over the secure communications channel and a short-range communications protocol stack may be used to increase security in the computing device 210 and sensor node 110A. In particular, cryptographic keys used to secure communication in the wireless stack can be prevented from being exposed to the short-range communications protocol stack. This may be achieved by, for example, having physically separated memory and processors to implement the different protocols.

The computing device 210 is arranged to generate instructions and communicate control messages via its wireless interface to the sensor node 110A. For example, the computing device 210 may communicate a "REQUEST_DATA" control message to the sensor node 110A to cause the sensor node 110A to perform one or more actions in relation to data stored on the sensor network 100. In another example, the computing device 210 is arranged to communicate to the sensor node 110A a control message relating to security of the sensor network 100, such as "REKEY" that causes the sensor node 110A to initiate a re-keying of a cryptographic key that is in use in the sensor network 100.

The sensor node 110A is configured for the receipt of one or more control messages from the computing device 210 and to perform actions based on the control message(s). In particular, the sensor node 110A comprises a processor to process control messages and interpret instructions contained therein. Actions executed by the sensor node 110A may comprise communicating further messages, via secure communications channels, to others of the plurality of sensor nodes 110 and WAPs 120 of the sensor network 100, to cause the sensor nodes 110 and WAPs 120 to perform operations based on the control message.

Figure 3:
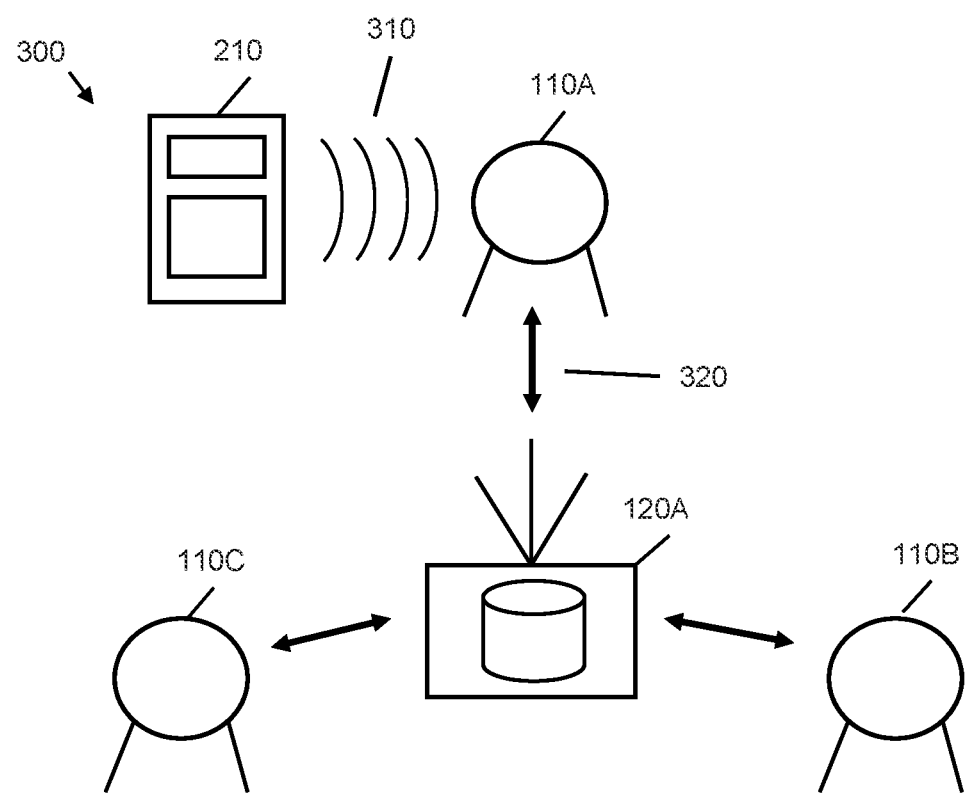
FIG. 3 is a schematic diagram of a computing device and nodes of a sensor network according to an example.

There will now be described an example of a system which may be used in conjunction with the other apparatus and methods described herein to control a sensor network. FIG. 3 is a simplified schematic diagram of a system comprising sensor nodes 110A-110C and WAP 120A and a computing device 300, according to an example. The system 300 comprises a subset of the sensor nodes 110A, 110B, 110C, and WAP 120A of the sensor network 100 shown in FIG. 1. Each of the sensor nodes 110 is in communication with the WAP 120A. The communications channels between the sensor nodes 110 and WAP 120A are secure. For example, the communications channels may be secured with one or more cryptographic keys. As described in relation to FIG. 1, the secure communications channels between the sensor nodes 110 and the WAP 120A may be secured with the same aircraft-wide master key throughout the aircraft.

In FIG. 3, the first sensor node 110A is in communication with a computing device 210 via a communications channel 310. The first sensor node 110A is responsive to receipt of control messages from the computing device 210 via the communications channel 310. An operator of the computing device may cause the computing device 210 to send a control message to the first sensor node 110A to cause the sensor node 110A to communicate, via a secure communications channel 320, with the WAP 120A. The WAP 120A is responsive to communications, via the secure communications channel 320, to perform an operation on the basis of the control message. This allows the operator to initiate the control of the sensor network 300 of wireless nodes by using the computing device 210 to communicate control messages to the first sensor node 110A.

Figure 4:
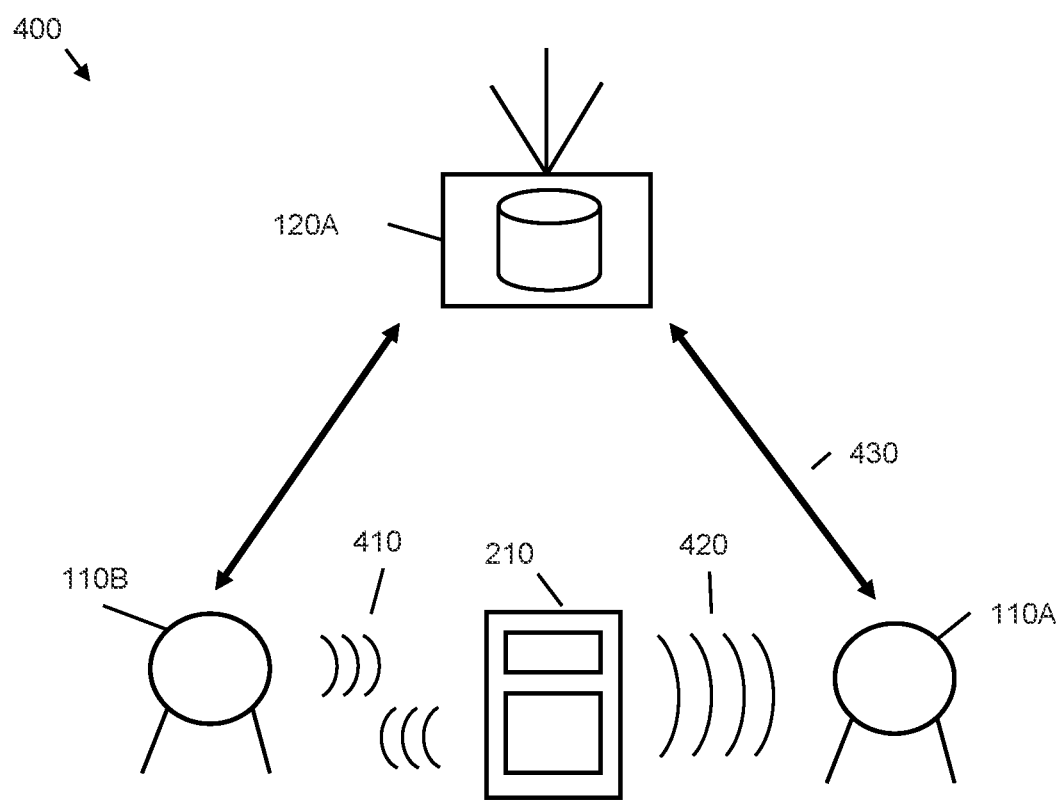
FIG. 4 schematic diagram of a computing device and nodes of a sensor network according to an example.

FIG. 4 is a simplified schematic diagram of a system 400, comprising two wireless sensor nodes 110A, 110B and a WAP 120A, according to an example. In FIG. 4, a first of the sensor node 110A is a new sensor node or a replacement sensor node in the sensor network 100. The computing device 210 is arranged to communicate with a second of the sensor nodes 110B, to receive data from the second sensor node 110B, to enable the first sensor node 110A to be installed on the sensor network 100. For example, when installing the new or replacement sensor node 110A, authorised ground crew personnel can use the computing device 210 and existing second sensor node 110B, which already has an established secure communications channel with the WAP 120, to acquire data such as cryptographic keys from the second sensor node 110B. In particular the computing device 210 can be used to communicate via a communications channel 410 to acquire data. The computing device 210 is arranged to communicate the data received from the sensor node 110B to the new sensor node 110A via a communications channel 420 in a manner which is similar to the communication between the computing device 210 and sensor node 110A shown in FIGS. 2 and 3. Although FIG. 4 shows a pair of sensor nodes 110A and 110B, a WAP such as one of the WAPs 120 shown in FIG. 1 could be used instead of the second sensor node 110B, to obtain data from the sensor network 100. Similarly, a new WAP can be installed to replace an existing WAP using system similar to that shown in FIG. 4.

The computing device 210 is further arranged to transmit a control message to the first sensor node 110A, to cause the sensor network to perform one or more operations to install the new or replacement sensor node 110A. In response, the first sensor node 110A communicates, using one or more cryptographic keys received from the computing device from the second sensor node 110B, via a secure communications channel 430 with the WAP 120A. The secure communications channel 430 is used to establish new cryptographic keys on the first sensor node 110A, for example by performing a key exchange, using a key exchange algorithm, with the WAP 120A. Furthermore the WAP 120A can perform further operations, such as distribution of cryptographic keys from the sensor node 110A, to the other of the plurality of sensor nodes in communication with the WAP 120A.

Figure 5:
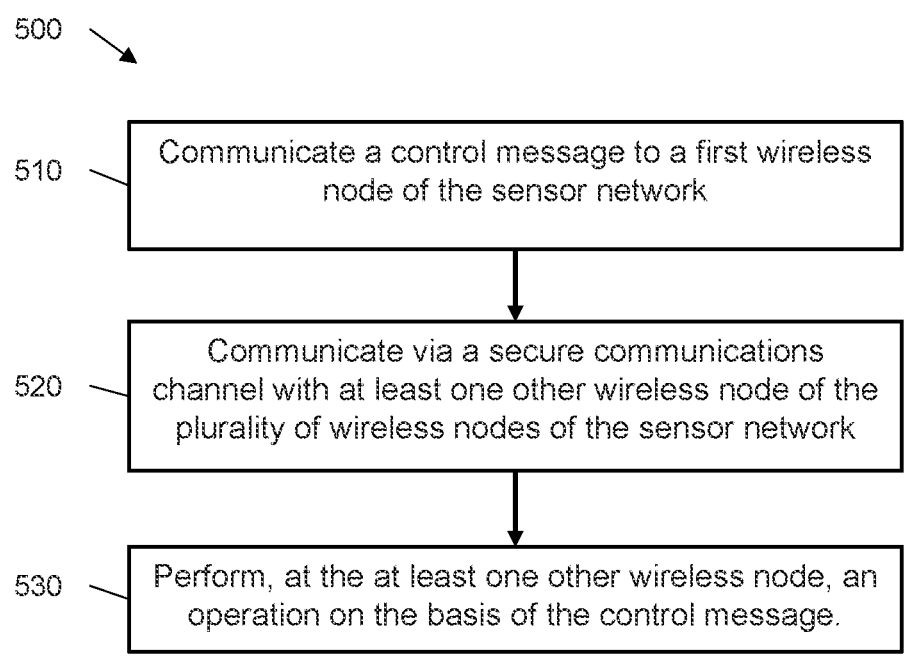
FIG. 5 is a flow diagram showing a method of operating a sensor network in an aircraft, according to an example.

FIG. 5 is a flow diagram showing a method 500 of operating a sensor network in an aircraft. The method 500 may be implemented on the sensor network 100 and computing device 210 shown in FIGS. 1 to 4. In particular, the method 500 is implemented on a sensor network comprising a plurality of wireless nodes in which secure communications channels exist between wireless nodes in the sensor network.

At block 510 a control message is communicated to a first wireless node of the sensor network. The first wireless node may be any of the sensor nodes 110, or WAPs 120, shown in the preceding Figures. According to a first example, the control message is generated at a computing device external to the sensor network, such as the computing device 210 shown in FIG. 2. The computing device transmits the control message to the first wireless node.

In an example, the control message is generated by an operator initiating the generation of the control message at the computing device. The computing device may comprise a graphical user interface (GUI) that allows the operator to initiate various actions. For example, in the case of a data request, the computing device transmits a "REQUEST_DATA" message, via the communications channel between the computing device and the first wireless node, to the first wireless node. In a second example, the computing device communicates a control message to re-key a cryptographic key. In this case, the control messages comprise a "REKEY" command and an identifier of the cryptographic key. An identifier may comprise an identifier of the key and also an identifier of the wireless node or nodes in communication with the first wireless node that stores the key. Further additional messages may be communicated to the first wireless node by the computing device.

At block 520 the first wireless node communicates, via a secure communications channel, with at least one other wireless node of the plurality of nodes of the sensor network. In one example, communication with the at least one other wireless node comprises sending one or more messages via the secure communications channel. In one example, the one or more message(s) sent over the secure communications channel may comprise instructions to execute operations on the at least one other node. For example, the message(s) may comprise cryptographic keys and/or instructions to replace cryptographic keys with keys sent in the messages.

At block 530 the at least one other wireless node performs an operation on the basis of the control message. As described in examples herein, in one case the operation is an operation to secure the sensor network, such as an operation to re-key the aircraft. In another case, the operation may relate to obtaining data such as aircraft sensor data from other nodes in the plurality of wireless nodes in the sensor network.

According to an example, the step of communicating a control message to a first wireless node of the sensor network at step 510 may be preceded by a step of communicating one or more cryptographic keys to the first wireless node.

When the method 500 is implemented by the computing device 210 shown in FIG. 2, a user can control the computing device 210 to send one or more cryptographic keys to the sensor node 110A. According to an example, the computing device 210 securely generates the one or more cryptographic keys communicated to the first wireless node. In another example, the one or more cryptographic keys are pre-loaded on the computing device 210. For example, the one or more cryptographic keys may be generated separately on a secure device other than the computing device 210.

The control message may comprise an instruction to the sensor network to perform one or more operations in relation to the one or more cryptographic keys sent to the first wireless node. In particular, a control message sent from the computing device to the first wireless node causes the first wireless node to communicate, via a secure communications channel, with at least one other node of the sensor network. Communication between the first wireless node and the at least one other wireless node may comprise sending of the one or more cryptographic keys from the first wireless node to the at least one other wireless node and an acknowledgement from the at least one other wireless node to the first wireless node that a new cryptographic key has been received at the at least one other wireless node.

Figure 6:
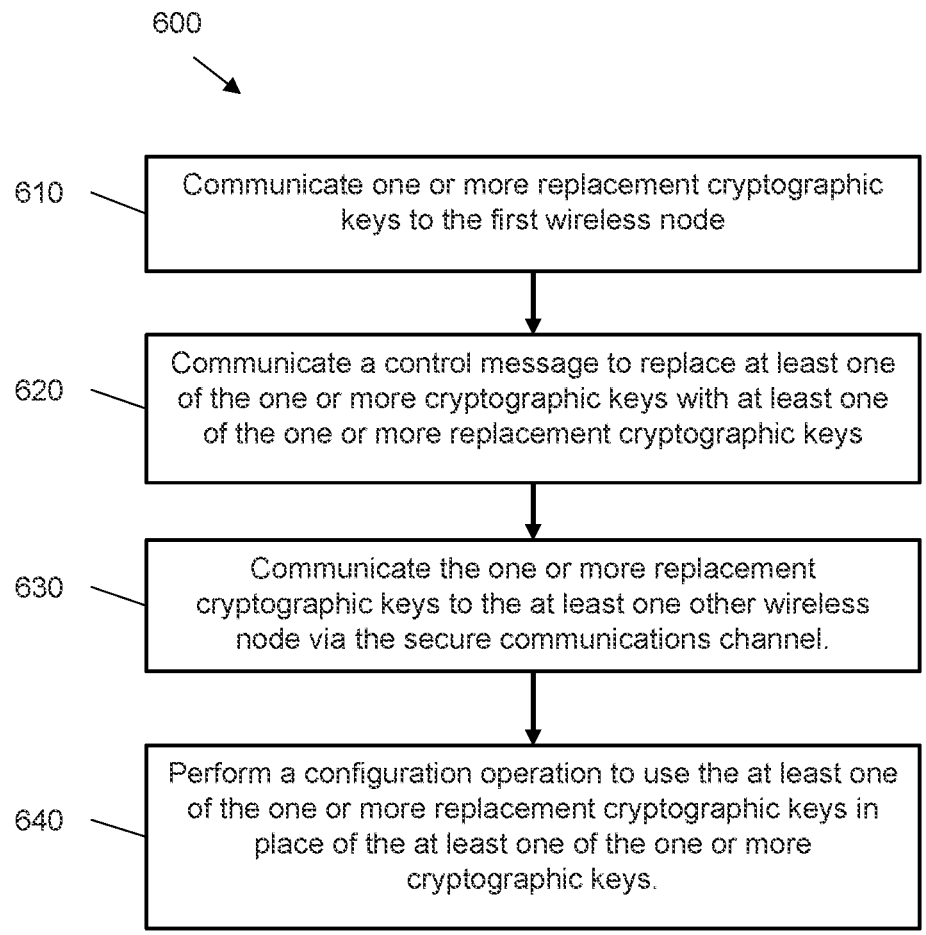
FIG. 6 is a flow diagram showing a method to replace a cryptographic key in a sensor network according to an example.

FIG. 6 is a flow diagram showing a method 600 to replace a cryptographic key in a sensor network, according to an example. The method 600 may be implemented on the sensor network 100 and by the sensor nodes 110 and WAPs 120. In particular, the "first wireless node" referred to in the method 600 may be either of a sensor node 110 or a WAP 120 that is in secure communication in the sensor network 100 with at least one other wireless node (either a WAP 120 or a sensor node 110) in the sensor network.

At block 610 one or more replacement cryptographic keys are communicated to the first wireless node. According to an example, the one or more replacement cryptographic keys is/are cryptographic keys used to secure one or more communications channels between wireless nodes of the sensor network and/or to secure data in the sensor network. In relation to the system 300 shown in FIG. 3, block 610 may be executed by the computing device 210. In particular, an operator may bring the computing device 210 into proximity with the sensor node 110A to communicate the one or more replacement cryptographic keys to the sensor node 110A.

At block 620 a control message to replace at least one of the one or more cryptographic keys with at least one of the one or more replacement cryptographic keys is communicated to the first wireless node e.g. by a computing device such as computing device 210.

At block 630 the one or more replacement cryptographic keys are communicated to the at least one other wireless node via the secure communications channel from the first wireless node.

At block 640 a configuration operation to use the at least one of the one or more replacement cryptographic keys in place of the at least one of the one or more cryptographic keys is performed. This configuration operation may comprise performing one or more operations on data involving the new cryptographic keys. For example, a configuration operation may comprise decrypting or verifying data that is encrypted or signed with at least one of the old cryptographic keys and re-encrypting and/or re-authenticating the data with at least one of the new cryptographic keys.

Additionally or alternatively, in some examples, a configuration operation of forwarding the one or more replacement cryptographic keys from the at least one other node, to the other of the plurality of nodes in secure communication with the at least one other node, may be performed. For example, in the system 300 shown in FIG. 3, the first sensor node 110A communicates, via the secure communications channel, the one or more replacement cryptographic keys received from the computing device 210 to the WAP 120A. In one example, the WAP is arranged to decrypt and authenticate the one or more cryptographic keys received from the first sensor node 110A. The WAP 120A performs a configuration operation, comprising using at least one of the one or more replacement cryptographic keys in the place of the one or more cryptographic keys currently in use. The configuration operation may comprise sending the one or more replacement cryptographic keys to the other sensor nodes 110B, 110C. In an example, the other sensor nodes 110B, 100C are arranged to perform configuration operations to use the replacement cryptographic keys in the place of the previously used cryptographic keys.

Figure 7:
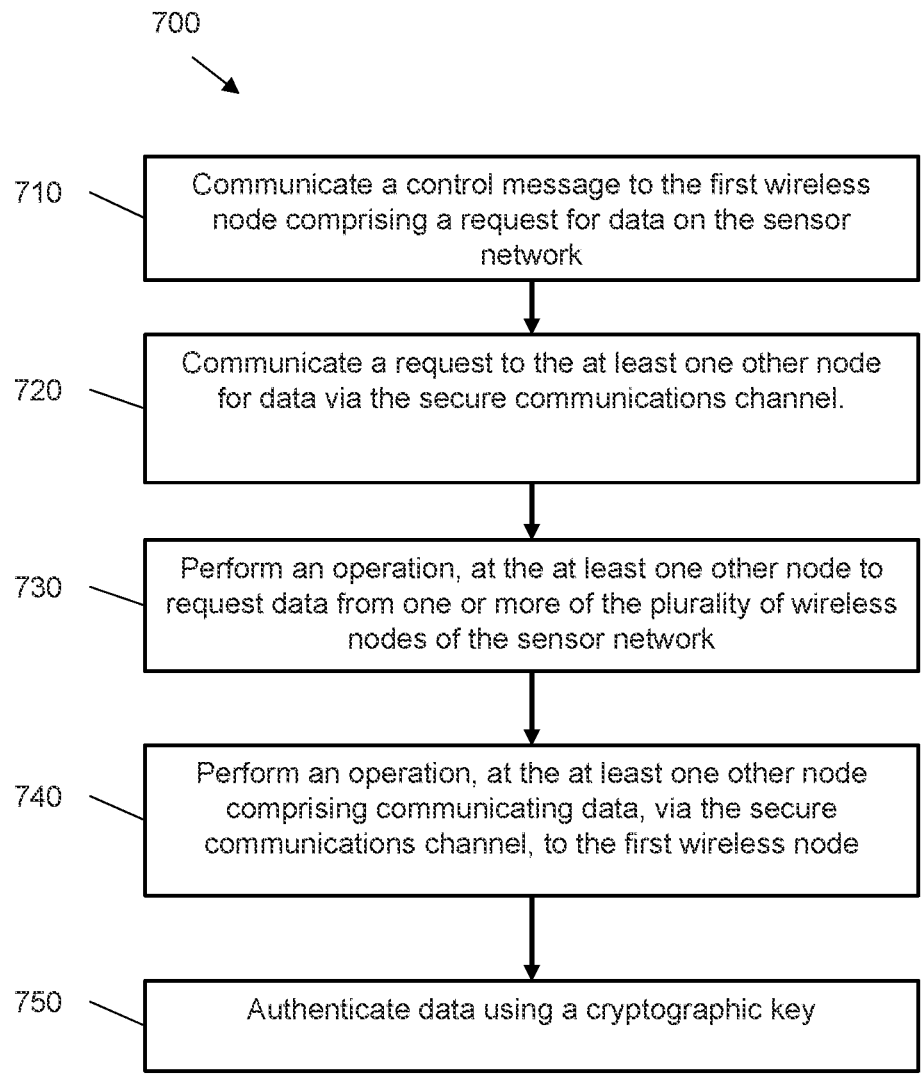
FIG. 7 is a flow diagram showing a method of requesting data from a sensor network according to an example.

FIG. 7 is a flow diagram showing a method 700 of requesting data from a sensor network, according to an example. The method 700 may be implemented on the sensor network 100 shown in FIG. 1. The method 700 is used to retrieve data such as sensor data from the aircraft, e.g. when the aircraft is in maintenance.

At step 710 a control message is communicated to the first wireless node. The control message comprises a request for data, "REQUEST_DATA", and is received over a communications channel at a wireless interface of the first wireless node. As with method 600 shown in FIG. 6, in an example, the control message may be generated at and sent from a computing device, such as computing device 210 shown in FIG. 2.

At block 720 a request for data is communicated to at least one other node of the sensor network, via a secure communications channel between the first wireless node and the at least one other wireless node. When the method 700 is implemented on the system 300 shown in FIG. 3, the computing device 210 sends the request data control message, "REQUEST_DATA", to the first wireless sensor node 110A. The sensor node 110A receives the control message and may generate further messages that are sent to the other wireless nodes.

At block 730 the at least one other wireless node performs an operation, to request data from one or more of the plurality of wireless nodes of the sensor network. In an implementation of the method shown in FIG. 7 on the system 300 the WAP 120A receives messages communicated to it via the secure communications channel between the sensor node 110A and WAP 120A. The WAP 120A can send a request to the other sensor nodes 110B, 110C to request that the other sensor nodes 110B, 110C send sensor data to the WAP 120A.

At block 740 the at least one other node performs an operation comprising communicating data, via the secure communications channel, to the first wireless node. In an implementation of the method shown in FIG. 7 on the system 300 the WAP 120A forwards any sensor data received from the sensor nodes 110B, 110C to the sensor node 110A. Following receipt of data, the first wireless node, at block 750, authenticates the data using a cryptographic key. According to an example, following receipt of data, authentication of data may comprise the first wireless node performing one or more data integrity checks including checking data field lengths and/or ranges of parameters in the case of sensor data.

According to an example, the first wireless node is arranged to authenticate the data using a cryptographic key different from the cryptographic key used to secure the secure communications channel between the first wireless node and the at least one other wireless node. The cryptographic key used to perform the authentication may be stored in a separate memory and, in certain cases, handled using a different processor that are physically isolated from the memory and processor that are used to store and process the cryptographic key used to secure the secure communications channel. In this arrangement an attacker that attempts to compromise the security of the secure communications channel by e.g. attempting to obtain the cryptographic key securing the channel, cannot simultaneously compromise the authenticity of the data received at the first wireless node if they succeed in comprising the security of the secure communications channel, without mounting a separate attack on the key used to authenticate data.

Figure 8:
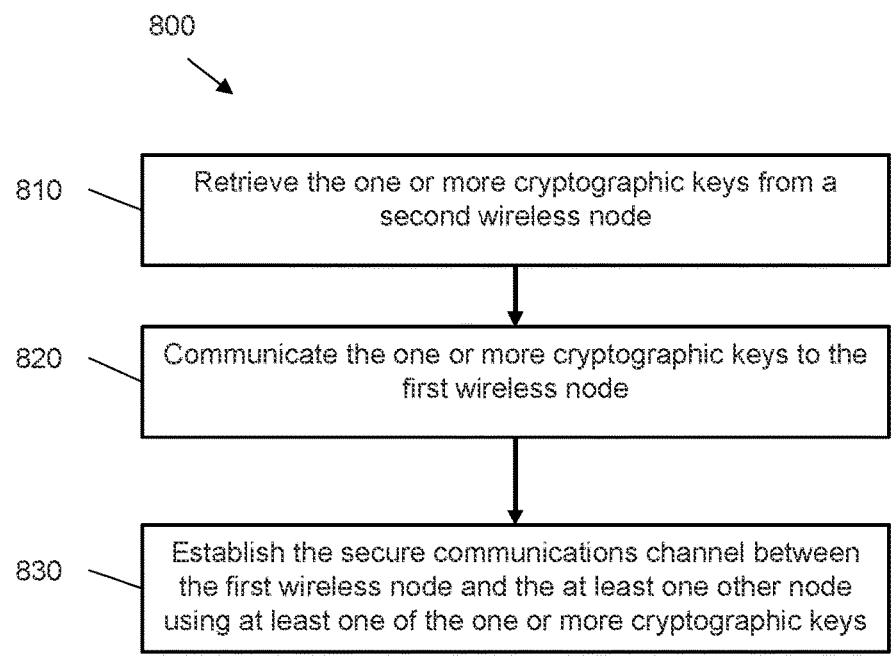
FIG. 8 is a flow diagram of a method of establishing a secure channel, according to an example.

FIG. 8 shows a flow diagram of a method 800 of establishing a secure channel according to an example. The method 800 may be used in conjunction with the apparatus and methods described herein. In particular, the method 800 may be implemented on the system 400 shown in FIG. 4, where a first wireless node (either a sensor node or a WAP) is to be installed in a sensor network and data is retrieved from a second wireless node already installed in the sensor network, such that the first wireless node can establish a secure communications channel with at least one other wireless node in the sensor network. According to an example data retrieved from the second wireless node may comprise one or more of cryptographic keys and aircraft information (for example, locations of nodes in the aircraft, wheel positions etc.).

At block 810 one or more cryptographic keys are retrieved from the second wireless node. In the context of implementing the method 800 on the system 400 shown in FIG. 4, an operator of the computing device 210 can move the computing device into the proximity of the second sensor node 110B such that the second sensor node 110B and computing device 210 can communicate with each other. The operator of the computing device 210 can retrieve one or more cryptographic keys stored on the second node 110B by sending a request for one or more cryptographic keys from the computing device 210 to the second sensor node 110B, over the communications channel 410. In response, the second sensor node 110B retrieves the cryptographic keys from storage and sends them to the computing device 210 via the communications channel 410.

At block 820, the one or more cryptographic keys are communicated to the first wireless node. In the example shown in FIG. 4, the computing device 210 communicates the one or more cryptographic keys to the first wireless node 110A via the communications channel 420. The first wireless node 110A stores the received cryptographic keys. In the case where the one or more cryptographic keys relate to different aspects of security, for example a first cryptographic key for securing the secure communications channel between the sensor node 110A and the WAP 120A, and a second cryptographic key for authenticating data, the sensor node 110A may be arranged to store the cryptographic keys in respective physically isolated storage locations.

At block 830, the first wireless node establishes a secure communications channel between itself and the at least one other wireless node using at least one of the one or more cryptographic keys. With reference again to FIG. 4, the sensor node 110A uses at least one of the one or more cryptographic keys (for example, the key that the sensor node 110B is using to securely communicate with the WAP 120A), to establish a secure communications channel with the WAP 120. Once the secure communications channel is established the sensor node 110A can execute the method 600 described previously with reference to FIG. 6, to establish one or more replacement cryptographic keys to replace the keys retrieved from the sensor node 110B.

Figure 9:
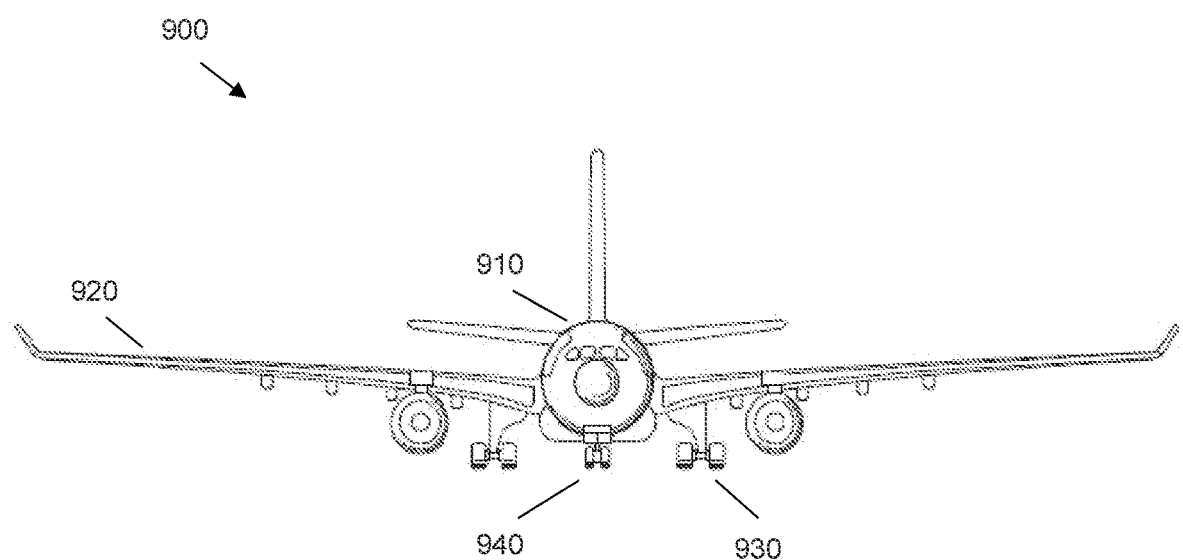
FIG. 9 is a schematic view of an aircraft comprising a sensor network according to an example.

FIG. 9 is a schematic view of an aircraft 900 comprising a fuselage 910, wings 920, main landing gear 930 and nose landing gear 940. According to an example, the aircraft 900 comprises a sensor network according to any of the examples described herein. The aircraft 900 may be used in conjunction with any of the methods described herein. According to an example, a plurality of wireless nodes are distributed at various locations around the aircraft 900. For example, in the landing gear 930, 940, the wings 920, and in the fuselage 1010.

Although the invention has been described above with reference to one or more preferred embodiments, it will be appreciated that various changes or modifications may be made without departing from the scope of the invention as defined in the appended claims.

The invention claimed is:

1. An aircraft sensor network on an aircraft, the aircraft sensor network comprising:
   a plurality of wireless nodes located on at least one landing gear of the aircraft;
   wherein a first wireless node of the plurality of wireless nodes is arranged to receive, over a first communications channel, from a remote computing device outside of and separate from the aircraft and the aircraft sensor network, at least one replacement cryptographic key and at least one control message to replace a current cryptographic key currently in use to secure communications transmitted over a secure second communications channel between the wireless nodes in the aircraft sensor network, and to communicate the at least one replacement cryptographic key to a second wireless node of the plurality of wireless nodes via the secure second communications channel which is different from the first communications channel, wherein the second wireless node is arranged to perform at least one operation based on the at least one control message, wherein the at least one operation includes a configuration operation to replace the current cryptographic key with the at least one replacement cryptographic key, wherein the first communications channel is a short-range wireless communications channel which operates on a radio frequency distinct from a radio frequency of the second communications channel, wherein the first wireless node includes a communications interface configured to interface with the first communications channel over which is received the at least one replacement cryptographic key from the remote computing device, and wherein the at least one operation comprises replacing, as a cryptographic key which secures the secure second communications channel, the current cryptographic key with the at least one replacement cryptographic key.

2. The aircraft sensor network of claim 1, further comprising communicating using the at least one replacement cryptographic key in place of the current cryptographic key to secure communications over the second communications channel.

3. The aircraft sensor network of claim 2, wherein the configuration operation comprises causing the second wireless node to send the at least one replacement cryptographic key to a third wireless node of the plurality of wireless nodes over the secure second communications channel in a communications encrypted by the current key.

4. The aircraft sensor network of claim 2, wherein the sensor network is arranged to secure the secure second communications channel using the at least one replacement cryptographic key.

5. The aircraft sensor network of claim 4, wherein the at least one control message comprises either a request for data stored on the sensor network to be sent to the first wireless node or an instruction to replace the current cryptographic key with the at least one replacement cryptographic key.

6. The aircraft sensor network of claim 5, wherein the configuration operation comprises communicating the data to the first wireless node via the secure second communications channel.

7. The aircraft sensor network of claim 1, wherein the first wireless node is a wireless sensor node and the second wireless node is a wireless access point.

8. The aircraft sensor node of claim 1, wherein the short-range wireless communications channel has a maximum communication range of no more than 20 meters.

9. An aircraft wireless node configured for use in a sensor network in an aircraft, the sensor network comprising a plurality of wireless nodes each located on at least one landing gear of the aircraft, and each of the wireless nodes is configured to:

receive at least one control message and at least one replacement cryptographic key from a remote computing device communicating with a first wireless node of the wireless nodes over a first communication channel, wherein the remote control device is separate from the aircraft; and communicate with at least one other wireless node of the plurality of wireless nodes of the sensor network, via a secure second communications channel, based on the at least one control message, wherein the secure second communications channel is secured by a current cryptographic key, wherein the communication includes the first wireless node sending at least one replacement cryptographic key and the control message over the secure second communications channel, wherein the first communication channel is on a radio frequency distinct from a radio frequency of the secure second communications channel, wherein the remote computer device is outside of the aircraft sensor network and is external to the aircraft, wherein the first wireless node includes a communications interface configured to interface with the first communications channel over which is received the at least one replacement cryptographic key from the remote computing device, and wherein the at least one control message causes the at least one other wireless node to replace the current cryptographic key with the at least one replacement cryptographic key and use the at least one replacement cryptograph key to secure the second communications channel.

10. The aircraft wireless node of claim 9, the aircraft wireless node is arranged to:

communicate, via the secure communications channel, with at least one other wireless node of the plurality of wireless nodes of the sensor network; and perform an operation based on the communication via the secure communications channel, the operation being on the basis of a control message received at the at least one other wireless node.

11. The aircraft wireless node of claim 9, wherein the first wireless node includes a first storage for storing the at least one replacement cryptographic key and a second storage for storing another cryptographic key wherein the first storage and second storage are isolated from each other.

12. The aircraft wireless node of claim 9, wherein the first communications channel has a maximum communications range of no more than 20 meters.

13. An aircraft comprising the sensor network of claim 1.

14. A method of operating a sensor network in an aircraft, the sensor network comprising a plurality of wireless nodes mounted on at least one landing gear of the aircraft, the method comprising:

a remote computing device wirelessly transmitting a control message and a replacement cryptographic key, via a first communication channel, to a first wireless node of the plurality of wireless nodes, wherein the remote computing device is outside of and separate from the aircraft and the sensor network;

the first wireless node communicating, via a secure second communications channel with a second wireless node of the plurality of wireless nodes of the sensor network, wherein the communicating includes sending the replacement cryptographic key and the control message; and the second wireless node performing an operation on the basis of the control message, wherein the operation includes replacing the current cryptographic key with the replacement cryptographic key, wherein the secure second communications channel is on a radio frequency distinct from a radio frequency of the first communications channel, wherein the first wireless node includes a communications interface configured to interface with the first communications channel over which is received the at least one replacement cryptographic key from the remote computing device, wherein the secure second communications channel is secured by a current cryptographic key, and wherein the operation performed on the basis of the control message comprises replacing the current cryptographic key with the at least one replacement cryptographic key and using the at least one replacement cryptograph key to secure the second communications channel.

15. The method of claim 14, further comprising communicating one or more cryptographic keys to the first wireless node.

16. The method of claim 14, the first communications channel has a maximum communications range of no more than 20 meters.

* * * * *